(12) United States Patent
Kushalappa et al.

(10) Patent No.: US 9,130,359 B2
(45) Date of Patent: Sep. 8, 2015

(54) ENERGY ABSORBING SYSTEM FOR ELECTRIC VEHICLE CHARGING STATION AND METHODS FOR MAKING AND USING THE SAME

(75) Inventors: Poovanna Theethira Kushalappa, Bangalore (IN); Sandeep Chandrakant Kulkarni, Bangalore (IN); Sudhakar Ramamoorthy Marur, Bangalore (IN)

(73) Assignee: SABIC GLOBAL TECHNOLOGIES B.V. (NL)

( * ) Notice: Subject to any disclaimer, the term of this patent is extended or adjusted under 35 U.S.C. 154(b) by 560 days.

(21) Appl. No.: 13/412,856

(22) Filed: Mar. 6, 2012

(65) Prior Publication Data

US 2013/0234663 A1 Sep. 12, 2013

(51) Int. Cl.
| | |
|---|---|
| *E01F 9/017* | (2006.01) |
| *E01F 9/07* | (2006.01) |
| *H02G 3/04* | (2006.01) |
| *B60L 3/00* | (2006.01) |
| *B60L 11/00* | (2006.01) |
| *B60L 11/18* | (2006.01) |

(52) U.S. Cl.
CPC ............ *H02G 3/0493* (2013.01); *B60L 3/0007* (2013.01); *B60L 11/005* (2013.01); *B60L 11/1824* (2013.01); *B60L 2230/16* (2013.01); *Y02T 10/7005* (2013.01); *Y02T 10/7022* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y10T 29/49002* (2015.01)

(58) Field of Classification Search
CPC ................. Y02T 90/12; E01F 9/017
USPC ...................... 320/109; 404/6, 9, 10
See application file for complete search history.

(56) References Cited

U.S. PATENT DOCUMENTS

| | | | | |
|---|---|---|---|---|
| 1,903,683 | A | * | 4/1933 | Nute ............... 40/608 |
| 4,174,014 | A | | 11/1979 | Bjorksten |
| 4,806,046 | A | * | 2/1989 | Clark .............. 404/10 |
| 5,523,666 | A | | 6/1996 | Hoelzl et al. |
| 5,597,262 | A | * | 1/1997 | Beavers et al. ............ 404/6 |
| 5,850,135 | A | | 12/1998 | Kuki et al. |
| 6,176,062 | B1 | * | 1/2001 | Fayle .............. 52/835 |
| 7,234,551 | B2 | | 6/2007 | Horii |

(Continued)

FOREIGN PATENT DOCUMENTS

| | | |
|---|---|---|
| DE | 4344563 C1 | 12/1994 |
| DE | 202010005543 U1 | 9/2010 |

(Continued)

OTHER PUBLICATIONS

Japanese Patent No. 10016689; Publication Date: Jan. 20, 1998; Abstract Only, 1 page.

(Continued)

*Primary Examiner* — Samuel Berhanu
*Assistant Examiner* — Jerry D Robbins
(74) *Attorney, Agent, or Firm* — Cantor Colburn LLP

(57) ABSTRACT

In one embodiment, an electric vehicle charging station comprises a body attached to a base, wherein the base is operably connected to a deflector mechanism, wherein the body moves from a rest position disposed along a major axis of the electric vehicle charging station to an impact position, with an articulation angle disposed therebetween, upon an impact having a force greater than or equal to 5 kiloNewtons.

20 Claims, 6 Drawing Sheets

(56) References Cited

U.S. PATENT DOCUMENTS

| | | | |
|---|---|---|---|
| 2002/0043025 A1* | 4/2002 | Zayas | 49/33 |
| 2005/0174663 A1* | 8/2005 | Carter et al. | 359/879 |
| 2006/0127715 A1 | 6/2006 | Botzelmann | |
| 2011/0062911 A1 | 3/2011 | Lloyd et al. | |
| 2012/0022685 A1* | 1/2012 | Miller et al. | 700/232 |
| 2013/0221917 A1 | 8/2013 | Kulkarni et al. | |

FOREIGN PATENT DOCUMENTS

| | | |
|---|---|---|
| DE | 102009016505 A1 | 10/2010 |
| EP | 1447254 A2 | 8/2004 |
| EP | 2267225 A1 | 12/2010 |
| GB | 2055704 A | 3/1981 |
| GB | 2323877 A | 10/1998 |
| JP | 5012616 A | 4/1975 |
| JP | 6270696 A | 9/1994 |
| JP | 8192639 A | 7/1996 |
| JP | 10016689 A | 1/1998 |
| JP | 2001167802 A | 6/2001 |
| JP | 2003045392 B2 | 2/2003 |
| JP | 2004175301 B2 | 6/2004 |
| JP | 2006306249 A | 11/2006 |
| KR | 2020110003169 U | 3/2011 |
| WO | 2005075745 A1 | 8/2005 |
| WO | 2005090687 A1 | 9/2005 |
| WO | 2009156769 A1 | 12/2009 |
| WO | 2010114455 A1 | 10/2010 |
| WO | 2011007223 A1 | 1/2011 |

OTHER PUBLICATIONS

Japanese Patent No. 2001167802; Publication Date: Jun. 22, 2001; Abstract Only, 1 page.
Japanese Patent No. 2003045392; Publication Date: Feb. 14, 2003; Abstract Only, 1 page.
Japanese Patent No. 2004175301; Publication Date: Jun. 24, 2004; Abstract Only, 1 page.
German Patent No. 202010005543 (U1); Publication Date: Sep. 30, 2010; Machine Translation; 28 Pages.
International Search Report; International Application No. PCT/IB2012/056777; International Filing Date: Nov. 28, 2012; Date of Mailing: Nov. 8, 2013; 6 Pages.
Japanese Patent Publication No. 5012616 (Y1); Publication Date: Apr. 18, 1975; Machine Translation; 7 Pages.
Korean Publication No. 2020110003169 (U); Publication Date: Mar. 30, 2011; Machine Translation; 12 Pages.
Teo Biocina; "Volta EV Charging Station"; http://teobiocina.com/Volta-EV-Charging-Station; Accessed: Apr. 16, 2014; Document No. XP-002723409; 2 Pages.
Written Opinion of the International Searching Authority; International Application No. PCT/IB2012/056777; International Filing Date: Nov. 28, 2012; Date of Mailing: Nov. 8, 2013; 6 Pages.
Machine Translation of DE102009016505(A1); Publication Date: Oct. 14, 2010; 13 Pages.

* cited by examiner

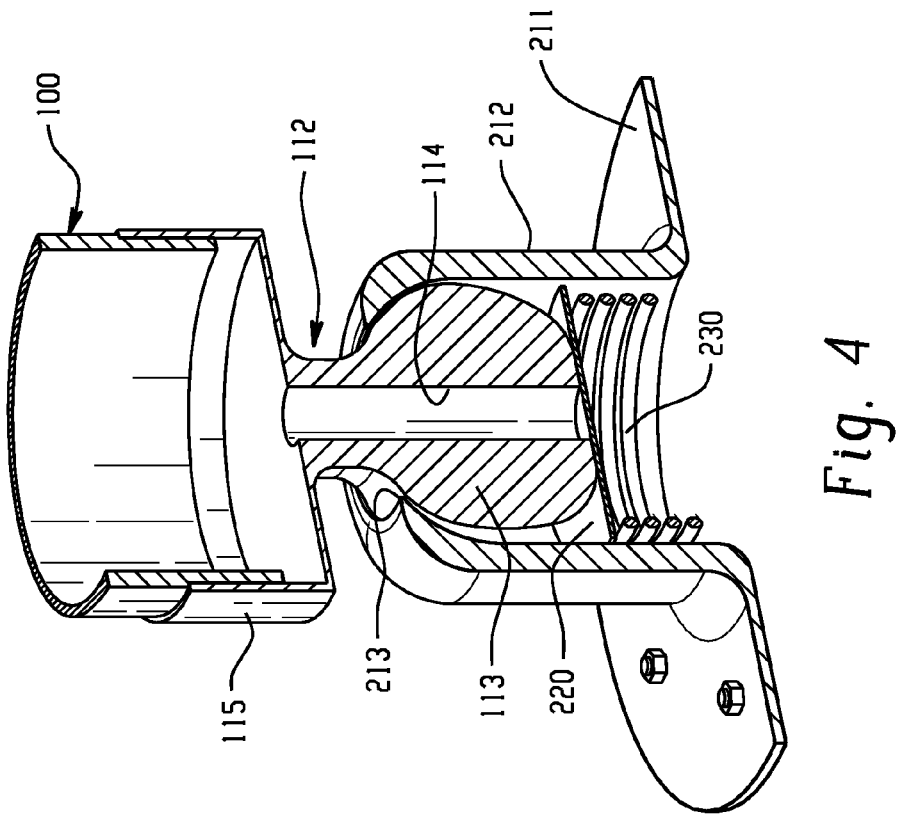
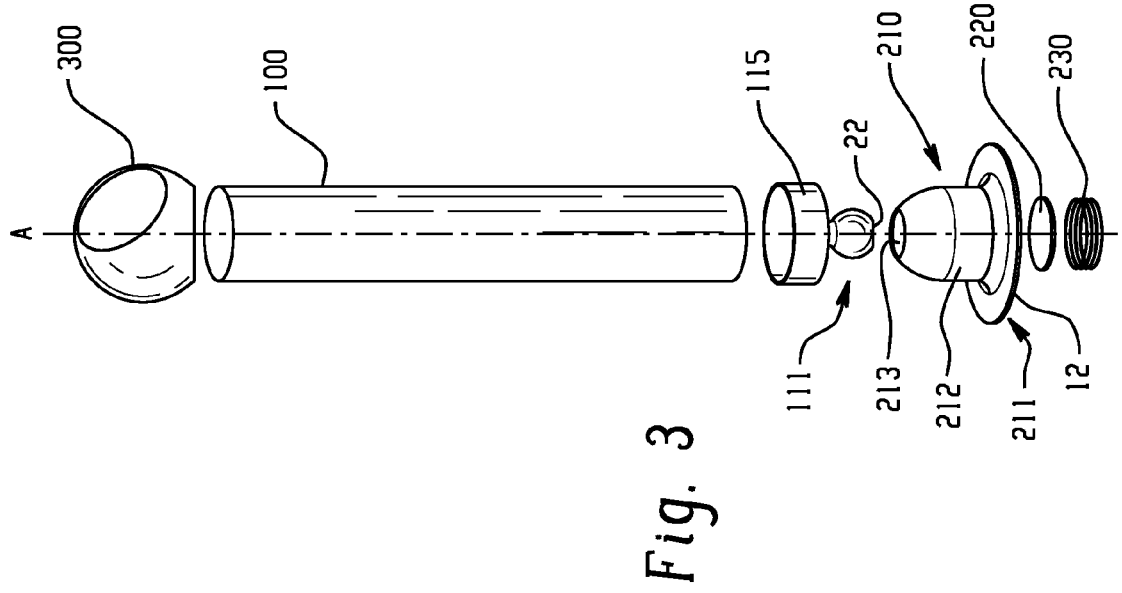
Fig. 4
Fig. 3

ENERGY ABSORBING SYSTEM FOR ELECTRIC VEHICLE CHARGING STATION AND METHODS FOR MAKING AND USING THE SAME

TECHNICAL FIELD

The present disclosure relates to an energy absorbing system for electric vehicle charging stations and associated elements.

BACKGROUND

Recent awareness of human impact on environmental pollution has propelled the need to develop environmentally friendly alternatives to gasoline powered vehicles such as electric vehicles. For example, the continued economic development of India, China, and Brazil will lead to a staggering increase in the number of vehicles on the world's roads. If present trends continue, there will be an estimated 2.5 billion vehicles on the road by 2050, which is an increase from the nearly 600 million present in 2010. With an unpredictable oil supply and increased environmental changes associated with fossil fuel burning, electrification of short-haul transportation is an attractive alternative (e.g., electrically powered vehicles).

With more electric vehicles on the roads, an infrastructure will need to be built to charge these electric vehicles. For example, it is projected that about 4.7 million charging stations, will be installed in various locations worldwide between 2010 and 2015. With an estimated cost of $2,500 per charging station and the potential for damage due to driver error, these Electric Vehicle Charging Station (EVCS) need to be safeguarded and protected from damage, e.g., damage caused by a collision with a parking vehicle.

SUMMARY

Disclosed herein are energy absorbing electric vehicle charging stations (EVCS), and methods for making and using the same.

In one embodiment, a tiltable electric vehicle charging station comprises: a body attached to a base, wherein the base is operably connected to a deflector mechanism, wherein the body moves from a rest position disposed along a major axis of the electric vehicle charging station to an impact position, with an articulation angle disposed therebetween, upon an impact having a force greater than or equal to 5 kiloNewtons.

In one embodiment, a deflector mechanism comprises: a base and a mounting bracket, wherein sidewalls extend from the base to an opening in the mounting bracket; and a thrust plate disposed between a biasing portion and a tilting mechanism, wherein a neck of the tilting mechanism extends through the opening, wherein the neck of the tilting mechanism extends to form a vessel configured to attach to a body of an electric vehicle charging station.

In one embodiment, a method of making an electric vehicle charging station comprises: attaching a body to a base, wherein the base is operably connected to a deflector mechanism that is configured to allow the body to move from a rest position to an impact position, with an articulation angle disposed therebetween, upon an impact with a force greater than or equal to 5 kiloNewtons.

The foregoing and other features of the present disclosure will be more readily apparent from the following detailed description and drawings of the illustrative embodiments.

BRIEF DESCRIPTION OF THE DRAWINGS

The following is a brief description of the drawings wherein like numbers are numbered alike and which are presented for purposes of illustrating the exemplary embodiments disclosed herein and not for the purposes of limiting the same.

FIG. 3 is an isometric perspective view of an electric vehicle charging station having a deflection mechanism.

FIG. 4 is a cutaway view along axis A of FIG. 3 of the deflector mechanism and body of the electric vehicle charging station.

DETAILED DESCRIPTION

Figure 2:
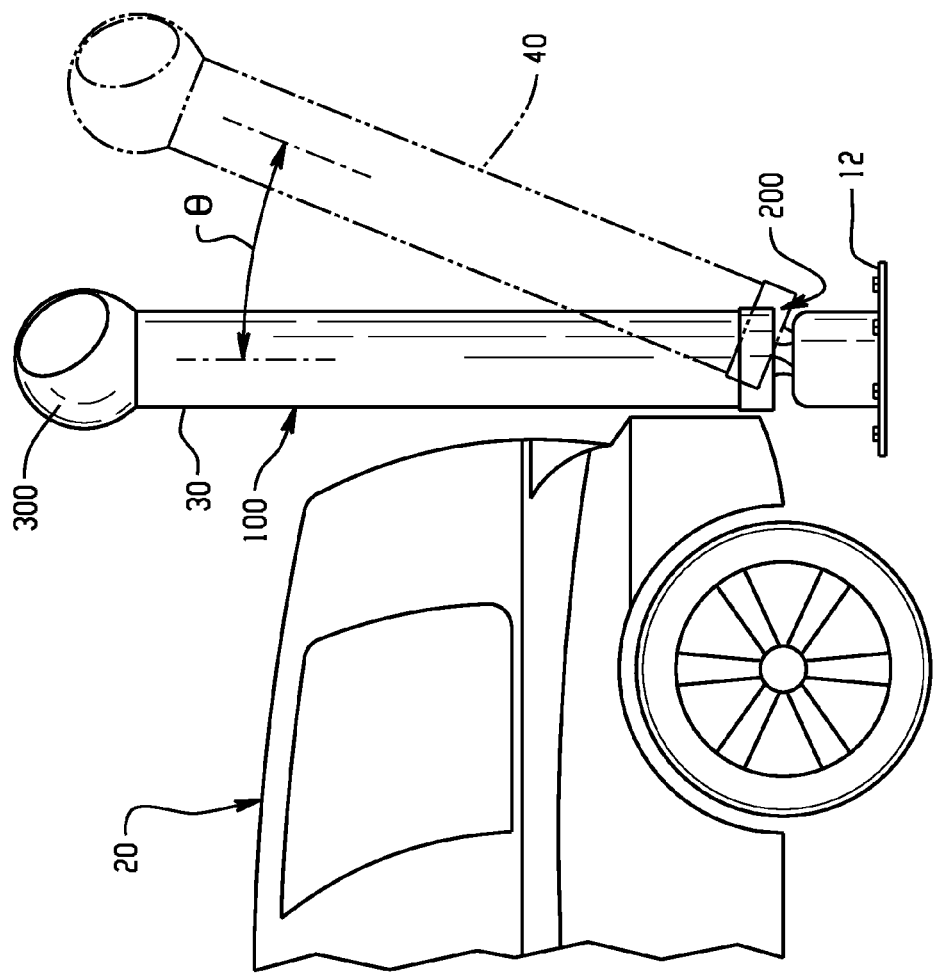
FIG. 2 is an isometric perspective view showing the electric vehicle charging station motion when subjected to an impact.

Disclosed herein are electric vehicle charging stations that can be configured to allow the body (e.g., housing) of an electric vehicle charging station to move (e.g., tilt) upon an impact in a direction of the impacting force to protect the body from damage. The electric vehicle charging station can comprise a deflector mechanism that can allow the body of the electric vehicle charging station to move from a rest position, which can be located along a major axis of the body of the electric vehicle charging station (e.g., vertical) to an impact position, which can be at an angle to the major axis of the electric vehicle charging station. The body of the electric vehicle charging station can, optionally, comprise an energy absorbing system to share the load from an impact. The deflection mechanism can comprise a biasing portion that can allow the body of the electric vehicle charging station to deflect away from an impacting vehicle such that the body of the electric vehicle charging station can remain in the deflected position after removal of the force with minimal or no damage to the electric vehicle charging station. An opposite force can then be applied to electric vehicle charging station to return it to the rest position.

The deflector mechanism can be contained with a mounting bracket, where the mounting bracket has an opening to allow a neck of the tilting mechanism of the deflector mechanism to extend there through. The body of the electric vehicle charging station can be fitted within a vessel that is attached to the neck of the tilting mechanism. A thrust plate dispersed above the biasing means can be configured to urge the tilting mechanism in a vertical position (e.g., along a major axis of the body of the electric vehicle charging station). The base can be configured to attach to a substrate (e.g., a sidewalk, curb, road, wall, etc.).

As used herein, an electric vehicle charging station refers to an apparatus, including hardware and software, to charge electrical vehicles. A charging station is typically a device or apparatus that supplies electric energy for the recharging of an electric vehicle, plug-in hybrid electric-gasoline vehicles' batteries or capacitors. Such devices can store and communicate (internally and with other devices over a network) code and data using machine-readable media, such as machine storage media (e.g., magnetic disks, optical disks, random access memory, read only memory, flash memory devices, phase-change memory, etc.) and machine communication media (e.g., electrical, optical, acoustical or other forms of propagated signals such as carrier waves, infrared signals, digital signals, etc.). In addition, electric vehicle charging stations also generally include a processor coupled to another component, such as a storage device, and/or input/output device (e.g., a keyboard, a touchscreen, and/or a display), and/or a network connection. The coupling of the processor and other components can generally be through one or more busses and bridges (e.g., bus controllers). The storage device and signals carrying the network traffic, respectively, represent a machine storage media and/or a machine communication media. Thus, the storage device of a given device generally stores code and/or other data for execution on the processor of that device. It is to be understood that various parts of an embodiment of the technology disclosed herein may be implemented using different combinations of software, firmware, and/or hardware.

Electric vehicle charging stations can be inherently dangerous because of the risk of exposure to high voltage if the electric vehicle charging station is damaged. With millions of charging stations planned for deployment throughout the world, the likelihood of an electric vehicle charging station being impacted by an object or vehicle, or subjected to vandalism or attempted theft, also increases significantly. An injury risk involves exposure to the high voltage electrical feed that powers the electric vehicle charging station where exposure is possible in the event of an accident, impact, incident, or act of vandalism. Contact with a live high voltage/ high current feed (e.g., 240 or 480 volts, 32 Amperes.) presents an electrical shock or electrocution hazard, and can, under certain circumstances, cause explosion of a vehicle as well as injuries to bystanders and pedestrians.

Various elements of the electric vehicle charging station, including, but not limited to the base, cap, body, deflector mechanism, control panel, electrical sockets, internal mounting mechanism for various electrical and electronic circuits, etc. can generally comprise a polymeric material. For example, the energy absorbing system comprise any thermoplastic material or combination of thermoplastic materials that can be formed into the desired shape and provide the desired properties, e.g., a material capable of elastic deformation without loss of structural integrity.

Exemplary materials include thermoplastic materials as well as combinations of thermoplastic materials with elastomeric materials, and/or thermoset materials. Possible thermoplastic materials include polybutylene terephthalate (PBT); acrylonitrile-butadiene-styrene (ABS); polycarbonate (LEXAN* and LEXAN* EXL resins, commercially available from SABIC Innovative Plastics); polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX* resins, commercially available from SABIC Innovative Plastics); blends of polycarbonate/polyethylene terephthalate (PET)/PBT; polybutylene terephthalate and impact modifier (XENOY* resins, commercially available from SABIC Innovative Plastics); acrylic-styrene-acrylonitrile (ASA, GELOY* resins, commercially available from SABIC Innovative Plastics); polyamides; phenylene sulfide resins; polyvinyl chloride PVC; high impact polystyrene (HIPS); polyethylene; low/high density polyethylene (L/HDPE); polypropylene (PP) (e.g., reinforced polypropylene; glass fiber reinforced polypropylene; long glass fiber reinforced polypropylene); expanded polypropylene (EPP); polyethylene and fiber composites; polypropylene and fiber composites (AZDEL Superlite* sheets, commercially available from Azdel, Inc.); long fiber reinforced thermoplastics (VERTON* resins, commercially available from SABIC Innovative Plastics) and thermoplastic olefins (TPO), as well as combinations comprising at least one of the foregoing.

An exemplary filled resin is STAMAX* resin, which is a long glass fiber filled polypropylene resin also commercially available from SABIC Innovative Plastics. Some possible reinforcing materials that can be used in any of the above described materials include fibers, such as glass, carbon, natural, modified natural, modified glass, modified carbon, polymeric, and so forth, as well as combinations comprising at least one of the foregoing; e.g., long glass fibers and/or long carbon fiber reinforced resins.; fillers, such as mineral fillers. The glass fibers and/or carbon fibers can be long or short, or a combination thereof. Combinations comprising at least one of any of the above-described materials can also be used. The various components of the electric vehicle charging station can be manufactured utilizing various molding processes (e.g., injection molding, thermoforming, extrusion, etc.) to provide an energy absorbing assembly.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 1:
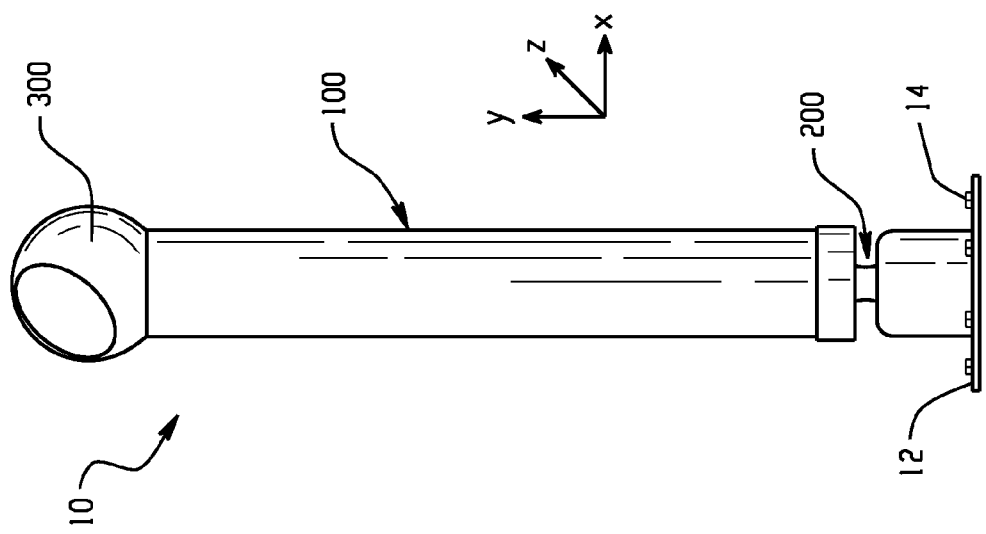
FIG. 1 is an isometric front view of an electric vehicle charging station having a deflection mechanism.

Turning now to FIG. 1, an electric vehicle charging station (10) is illustrated. As illustrated in FIG. 1, the electric vehicle charging station (10) can comprise a body (100) disposed between a cap (300) and a deflector mechanism (200). The cap (300) can comprise various controls for the electric vehicle charging station (10) that can enable the charging of an electric vehicle. In the absence of an external force (e.g., in a resting state), the body (100) (e.g., housing of the electric vehicle charging station) can be oriented along a major axis of the electric vehicle charging station (e.g., along the y-axis as illustrated in FIG. 1). For example, as illustrated in FIG. 1, the electric vehicle charging station (10) can be vertical relative to the surface to which the electric vehicle charging station (10) is attached (e.g., ground, sidewalk, etc.) and will remain so until an external force sufficient to move the body (e.g., greater than or equal to 5 kiloNewtons) is applied to the body (100). The deflector mechanism (200) can allow the electric vehicle charging station (10) to deflect away from a force exerted on the body (100) helping to prevent damage to the internal components of the electric vehicle charging station (10) (e.g., circuits, internal working mechanisms, etc.) and to the body (100) of the electric vehicle charging station (10) itself. In alternative embodiments, the electric vehicle charging station (10) can comprise a housing comprising greater than or equal to two mating parts that can be joined axially (e.g., vertically).

FIG. 2 illustrates how the electric vehicle charging station (10) reacts when an outside force is applied (e.g., when a vehicle impacts the electric vehicle charging station (10)). As can be seen in FIG. 2, the electric vehicle charging station (10) can move from a rest position (30) to an impact position (40) when a sufficient force is applied. The deflection mechanism (200) can allow the body (100) to tilt from its rest position (30) to the impact position (40) with an articulation angle, θ, therebetween. The articulation angle can be preserved without causing damage to the body (100) or to the wiring or other electrical components of the electric vehicle charging station (10). An impacting force of greater than or equal to, for example, 2 kiloNewtons (kN) can be sufficient to move the electric vehicle charging station (10) from the rest position (30) to the impact position (40). For example, the impacting force can be greater than or equal to 5 kN to less than or equal to 25 kN, specifically, greater than or equal to 7.5 kN, more specifically, greater than or equal to 10 kN, even more specifically, greater than or equal to 15 kN, and even more specifically, greater than or equal to 20 kN. When the impacting force moves the body (100) past a certain, threshold articulation angle, θ, as shown in FIG. 2, the electric vehicle charging station (10) will remain in the impact position (40) when the force is removed. For example, the articulation angle that can allow the electric vehicle charging station to remain in the impact position (40) when the force is removed can be greater than or equal to 5 degrees, specifically, greater than or equal to 10 degrees, more specifically, greater than or equal to 15 degrees, even more specifically, greater than or equal to 20 degrees, yet more specifically, greater than or equal to 25 degrees, still more specifically, greater than or equal to 35 degrees, and yet more specifically still, greater than or equal to 45 degrees. If the impacting force is removed before the threshold articulation angle is reached, then the electric vehicle charging can return to the rest position (30) when the impact force is removed.

The electric vehicle charging station (10) can be designed so that the deflector mechanism (200) can be attached to a base (12), which can be attached to a structure (e.g., road, sidewalk, ground, etc.) via an attachment mechanism (14) (e.g., screw, bolt, nail, adhesive, etc.). The deflector mechanism (200) can be located at a height that ensures that any impact will not occur with the deflector mechanism (200) of the electric vehicle charging station (10). In other words, the electric vehicle charging station (10) can be designed so that the impact will occur with the body (100), rather than the deflection mechanism (200). Configuring the deflector mechanism (200) to remain in the impact position (40) until a sufficient force has been exerted on the body (100) in the opposite direction, can allow the operator of the electric vehicle charging station (10) to notice that an impact has occurred and inspect the electric vehicle charging station (10) for damage. Once the damage has been assessed, the operator can impart a sufficient force as described above to return the electric vehicle charging station (10) to the rest position (30).

Turning now to FIG. 3, a more detailed version of the electric vehicle charging station (10) is illustrated. As can be seen in FIG. 3, the cap (300) can be attached at an end of the body (100) of the electric vehicle charging station (10) opposite the end that is attached to the base (12). The body (100) can be attached to a vessel (115) (e.g., fitted inside the vessel (115)), where the vessel (115) can be attached to a tilting mechanism (111) (e.g., ball joint, swivel mechanism, etc.). The tilting mechanism (111) can be disposed in a mounting bracket (210) extending from the base (12) toward the body, where the base (12) as mentioned, can be configured to attach to a structure such as a sidewalk, road, or the ground. In one embodiment, the electrical wiring to power the electric vehicle charging station (10) can be located in the vessel (115). For example, as illustrated in FIG. 4, the tilting mechanism (111) can comprise a bore (114) (e.g., a wiring bore) to hold the electrical wiring for the electric vehicle charging station (10) (e.g., can be configured to receive the electrical wiring). FIG. 3 further illustrates a biasing portion (230) disposed between a thrust plate (220) and the base (12). The thrust plate (220) can be configured to urge the tilting mechanism (111) in an upright position, where a neck (112) extending from the tilting mechanism (111) protrudes through an opening (213) in the mounting bracket (210). The opening (213) in the mounting bracket (210) can be formed by sidewalls (212) rising from the base (12) toward the body (100), where the sidewalls (212) converge to form the opening (213). Optionally, the thrust plate (220) can comprise an opening that can be configured to align with the bore (114) of the tilting mechanism (111) to allow the wiring of the electric vehicle charging station (10) to extend there through.

As also illustrated in FIG. 3, the body (100) and the tilting mechanism (111) can define an axis, A. Also illustrated in FIG. 3, is a biasing means (230) disposed between the substrate and a thrust plate (220) configured to urge the tilting mechanism (111) vertically, where a portion of the tilting mechanism (111) protrudes through an opening (213) in the mounting bracket (210) created by the side walls (212) rising from the base (12) of the mounting bracket (210). Optionally, the base (12) can comprise a flanged base (211) encircling a perimeter of the base (12). FIG. 4 illustrates a cut away view along axis A in FIG. 3 of the body (100), vessel (115), tilting mechanism (111), and mounting bracket (210). Further details of the deflector mechanism (200) are illustrated. For example, as shown in FIG. 4, the body (100) can be fitted within the vessel (115). The body (100) and the vessel can have a pressure fit and/or an adhesive material can be used to hold the body (100) and the vessel (115) together and/or mechanical fasteners such as screws, bolts, and/or rivets can be used.

Figure 12:
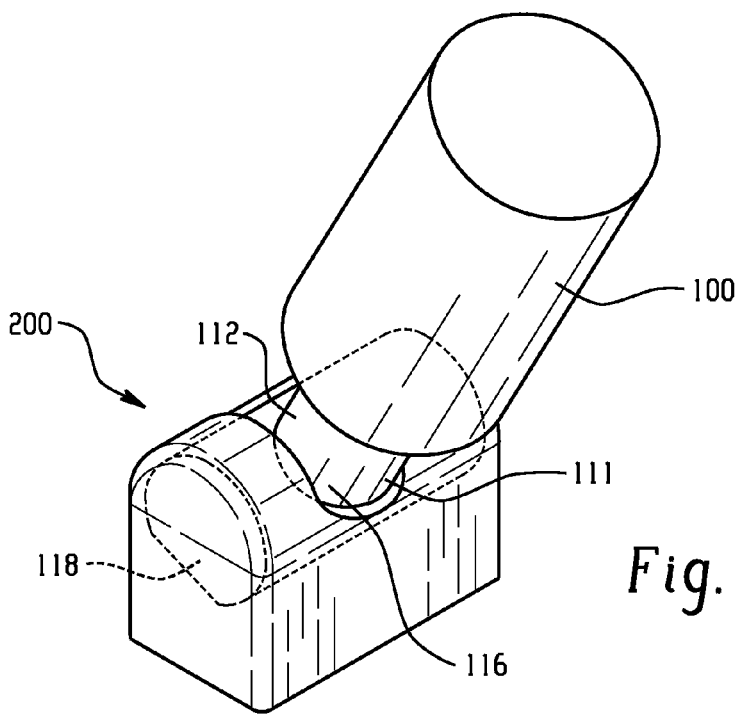
FIG. 12 illustrates an isometric perspective view of a tilting mechanism of a vehicle charging station.

As illustrated in FIGS. 3, 4, 5, and 6, the tilting mechanism (111) can, optionally, comprise a ball (113) (e.g., a sphere shaped ball) with a neck extending through the opening (213) in the mounting bracket (210). The bore (114) can traverse the length of the tilting mechanism (111). The ball (113) can be disposed between the thrust plate (220) and the opening (213). In one embodiment, the biasing portion (230) can urge the thrust plate (220) toward the ball (113) upward to orient the body (100) of the electric vehicle charging station (10) along the major axis, y (see FIG. 1). The tilting mechanism (111) can have a first surface (22) that can be configured to rest against the thrust plate (220) (e.g., the first surface can be flat) and held in place through compression of the biasing portion (230). In an alternate embodiment, as illustrated in FIG. 12, the deflection mechanism (200) can, optionally, comprise a tilting mechanism (111) comprising a swivel (116) and a cylinder (118) having a neck (112) protruding from the opening (213), where the swivel (116) allows the body (100) to move upon application of an impact. Other tiltable mechanisms include, but are not limited to, ratchet, spring loaded plates, etc.

The biasing portion (230) can comprise a spring, spring loaded pin, coil spring, helical spring, conical spring, compression spring, leaf spring, bellow spring and combinations comprising at least one of the foregoing. The biasing portion (230) can also comprise a resilient material (e.g., a rubber block thermoplastic elastomeric block, etc.). The biasing portion (230) can bias the thrust plate (220) against the ball (113) of the tilting mechanism (111). The biasing portion (230) can, optionally, be in a compressed stated such that the biasing portion (230) exerts a continuous force on the thrust plate (220). The biasing portion (230) can also, optionally, be magnetized, along with the thrust plate (220) such that the opposite poles (e.g., positive and negative) are facing one another. Further, optionally, the biasing portion (230) can comprise a plate disposed beneath the thrust plate (220) with an urging force electromagnetically driven by the power supply of the electric vehicle charging station (10). The biasing portion (230) can also, optionally, comprise a combination of magnets arranged with the opposite poles facing one another.

Figure 5:
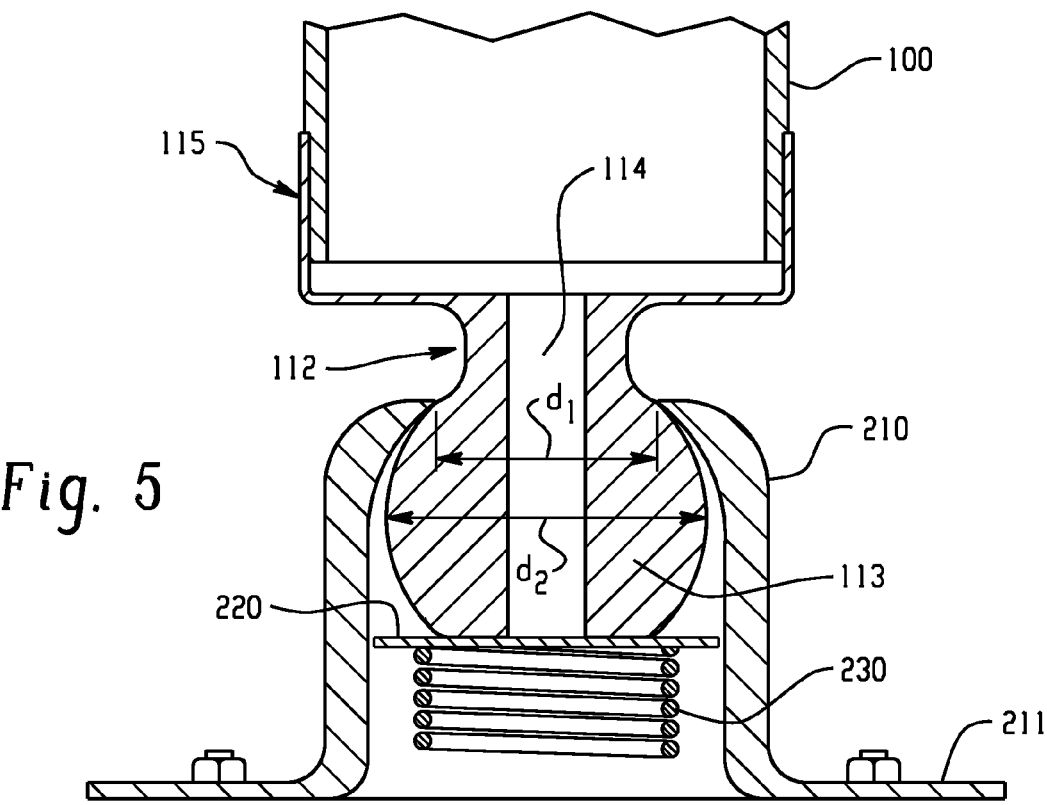
FIG. 5 is a front view illustrating the deflection mechanism in a rest position.

Turning now to FIG. 5, a front view of the mounting bracket (210) and tilting mechanism (111) assembly shown in FIG. 4 is illustrated. As can be seen in FIG. 5, the body (100) can be fitted within the vessel (115) and a tilting mechanism (111) can be, in turn, fitted within the opening (213) in the mounting bracket (210). The ball (113) can rest on the thrust plate (220), which can be held in compression through the biasing portion (230). The opening (213) in the mounting bracket (210) can comprise any shape. For example, as illustrated in FIG. 4, the opening (213) can be circular, with an opening diameter, $d_1$, that is smaller than a diameter of the ball (113), $d_2$, of the tilting mechanism (111). The diameter of the opening (213) in the mounting bracket (210), $d_1$, can help determine the angle ($\theta$) to which the body (100) can tilt upon impact, where the angle, ($\theta$) can be limited by the neck (112) of the tilting mechanism (111). For example, the neck (112) can touch the opening (213), which can limit the angle ($\theta$) to which the body (100) tilts upon an impact (e.g., the opening (213) can comprise an oval shape having an aspect ratio that is less than the diameter, $d_2$, of a ball (113) of the tilting mechanism (111). Alternatively, the opening (213) can comprise an oval shape, which can allow the body (100) of the electric vehicle charging station (10) to tilt in a predetermined direction, to a larger angle ($\theta$) than can be achieved with a circular opening, thereby absorbing energy over a larger displacement upon an impact. For example, the angle ($\theta$) can be 0 degrees to 90 degrees from the major axis, y, of the electric vehicle charging station (10), specifically, 0 degrees to 75 degrees, more specifically, 0 degrees to 60 degrees, even more specifically, 0 degrees to 45 degrees, and yet more specifically, 0 degrees to 30 degrees.

Figure 6:
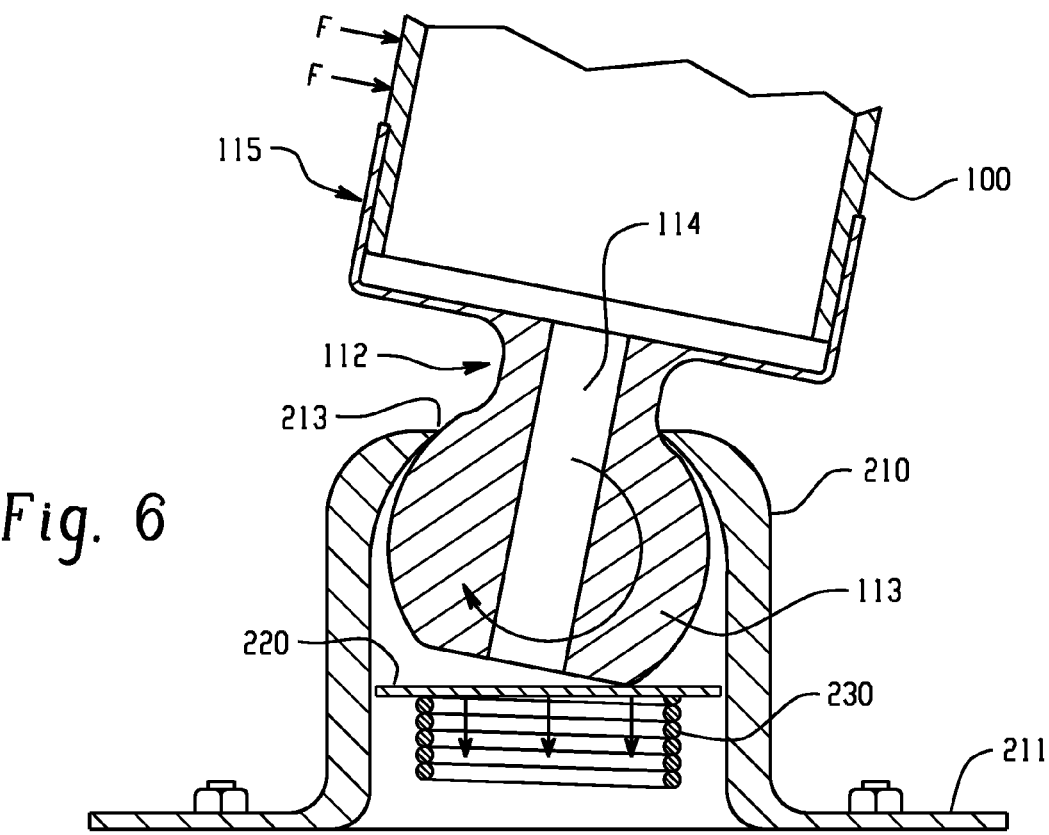
FIG. 6 is a front view illustrating the deflection mechanism when a force is applied.

FIG. 6 demonstrates the application of an external force, F, to the body (100). Upon impact, when an external force is applied to the body (100), the body (100) attempts to move from its rest position (30) (see FIG. 2). Such movement can be resisted by the biasing portion (230) pushing against the thrust plate (220). Friction between the opening (213) and the ball (113) can also help resist movement of the body (100) from the rest position (30). As previously described, when the impacting force moves the body past a certain, threshold articulation angle, the body can move from a rest position (30) to an impact position (40) (see FIG. 2) and remain in that position when the force is removed. An impacting force of greater than or equal to, for example, 2 kN can be sufficient to move the electric vehicle charging station (10) from the rest position (30) to the impact position (40). For example, the impacting force can be greater than or equal to 5 kN to less than or equal to 25 kN, specifically, greater than or equal to 7.5 kN, more specifically, greater than or equal to 10 kN, even more specifically, greater than or equal to 15 kN, and even more specifically, greater than or equal to 20 kN. When the impacting force moves the body (100) past a certain threshold articulation angle, $\theta$, as showing in FIG. 2, the electric vehicle charging station (10) will remain in the impact position (40) when the force is removed. For example, the articulation angle that can allow the electric vehicle charging station to remain in the impact position (40) when the force is removed can be greater than or equal to 5 degrees, specifically, greater than or equal to 10 degrees, more specifically, greater than or equal to 15 degrees, even more specifically, greater than or equal to 20 degrees, yet more specifically, greater than or equal to 25 degrees, still more specifically, greater than or equal to 35 degrees, and yet more specifically still, greater than or equal to 45 degrees. If the impacting force is removed before the threshold articulation angle is reached, then the electric vehicle charging can return to the rest position (30) when the impact force is removed. If the impacting force does not move the body (100) past the threshold articulation angle as herein described, then the electric vehicle charging can return to the rest position (30) when the impact force is removed.

When the force is applied, the body (100) can move until displacement ceases or until displacement is limited by the design of the opening (213) and neck (112). For example, the mounting bracket (210) can comprise a material having a friction coefficient that can prevent the body (10) of the electric vehicle charging station (10) from returning to the rest position (30) by resisting the force exerted by the biasing portion (230) on the ball (113) of the tilting mechanism (111). The impacting force, and/or the displacement can move (e.g., tilt) the body (100) of the electric vehicle charging station (10) such that the thrust plate (220) is pressed against the spherical part of the frustum sphere (113) portion of the tilting mechanism (111). In these circumstances, the coefficient of friction between the ball (113) and the opening (213) can prevent further movement once the force has been removed.

The geometry of the opening (213) can, optionally, be modified such that more or less of the ball (113) of the tilting mechanism (111) is in contact with the opening (213), thus increasing the friction (e.g., sliding friction) between the tilting mechanism (111) opening (213). The threshold force can, optionally, be adjusted by changing the force exerted by the biasing portion (230), and/or by changing the weight of the vessel (115) and/or body (100), and/or by changing the length of the body (100), by changing the shape and size of the ball (113), and/or by changing the coefficient of friction between the ball (113) and the opening (213). For example, the force needed to tilt the electric vehicle charging station (10) (e.g., threshold force) can be modified by increasing compression of the biasing portion (230). The tension of the biasing portion (230) can be changed by reducing the space between the thrust plate (220) and the base (211). Optionally, a plate can be located underneath the biasing portion (230) held in place using screws, nuts, bolts, etc. to reduce the space between the thrust plate (220 and the base (211).

Figure 10:
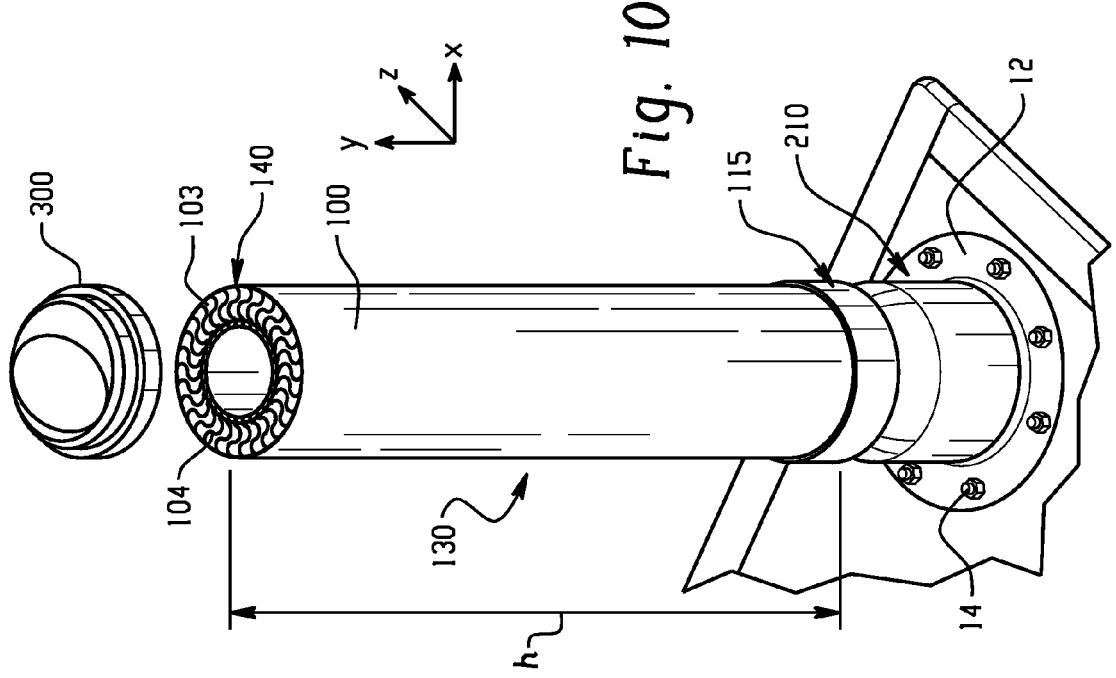
FIG. 10 is an isometric perspective view of an illustration of an electric vehicle charging station having a body comprising an energy absorbing system.

In an alternate embodiment, the body (100) can comprise an energy absorbing system (140) extending along the height, h, of the body (100) to provide intrinsic energy absorbing capabilities to the electric vehicle charging station (10). As illustrated in FIG. 10, a cap (300) can, optionally, be operably connected to the body (100).

Figure 11:
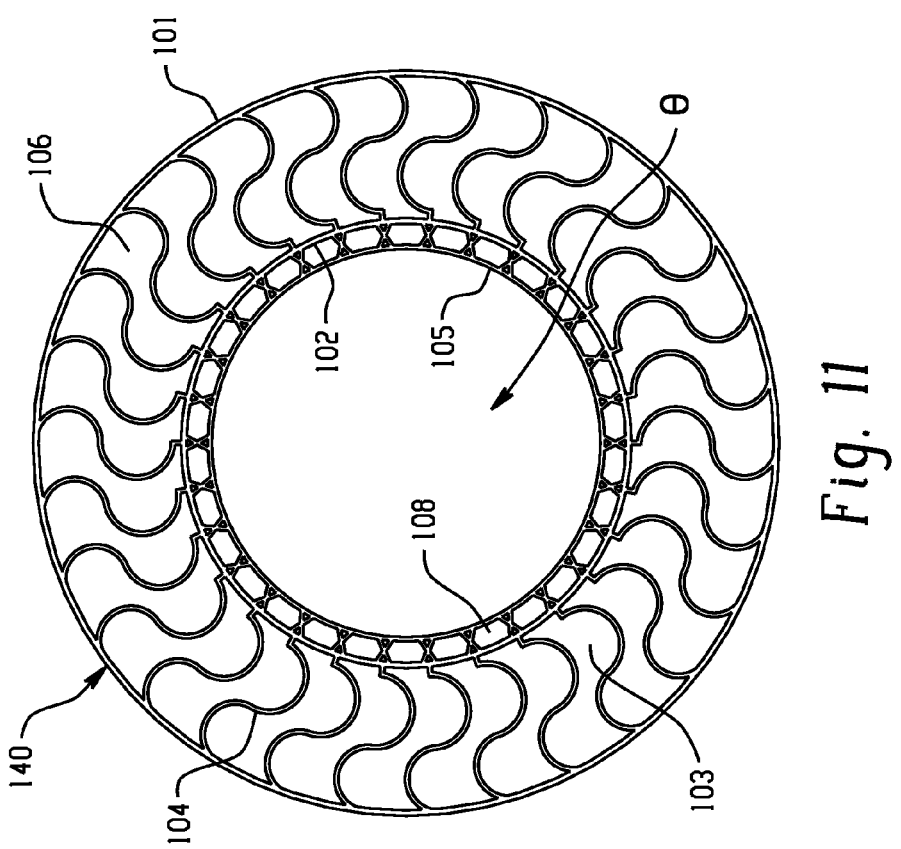
FIG. 11 is a top view of the energy absorbing system of FIG. 10.

FIG. 11 illustrates a cross-section of the body (100) in FIG. 10, which forms energy absorbing system (140). The energy absorbing system (140) can comprise a first wall (101) and a second wall (102), which define a first section (103) of the energy absorbing system (140). Dispersed throughout the first section (103) can be partition walls (104), which can form compartments (106) of varying shapes and size that can provide a varying degree of energy absorption and distribution upon impact with a charging vehicle. The second wall (102) and a third wall (105) can form a second section (108) with openings dispersed throughout the second section (108) to provide further energy absorbing capabilities to the body (100). The second wall (102) can define a second wall area having a circular or polygonal cross-section. In an embodiment, the first wall (101) can define a first wall area having a circular or polygonal cross-sectional area. The first cross-sectional area and the second cross-sectional area of the energy absorbing system (140) can vary axially from the base (132) to the cap (120). In this embodiment, the load from an impacting force can be shared between the deflector mechanism (200) and the body (100) comprising an energy absorbing system (140).

Methods of making an electric vehicle charging station are also contemplated. For example, a method of making an electric vehicle charging station can comprise attaching a body to a base, wherein the base is operably connected to a deflector mechanism that is configured to allow the body to move from a rest position to an impact position upon an impact with a force greater than or equal to 5 kiloNewtons.

The following examples are merely illustrative of the device disclosed herein and are not intended to limit the scope hereof. All of the following examples were based upon numerical simulations unless specifically stated otherwise.

EXAMPLES

Example 1

Figure 7:
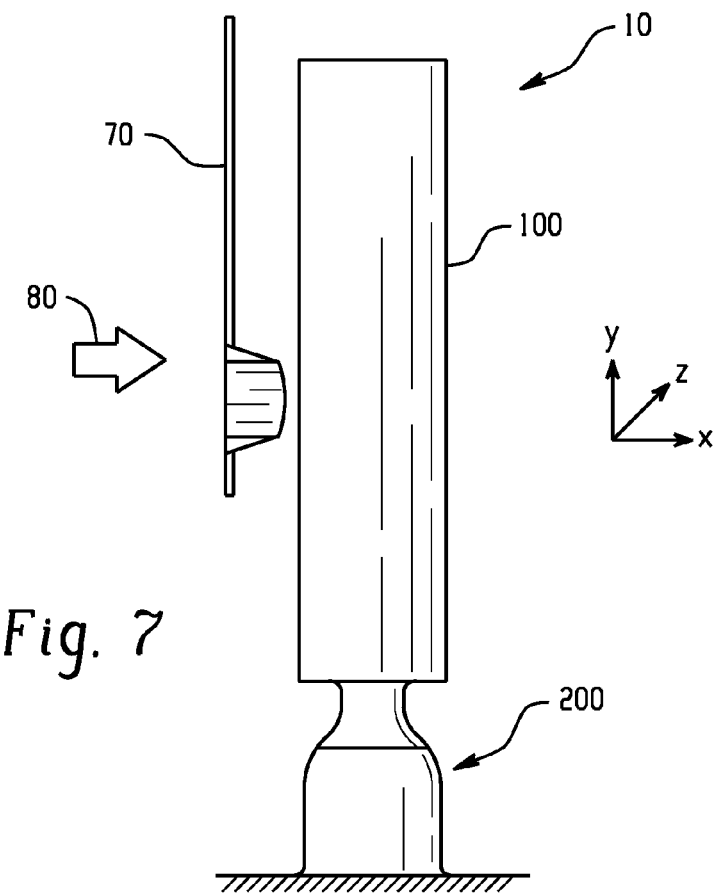
FIG. 7 illustrates an experimental set-up of an impacting vehicle on an electric vehicle charging station.
Figure 8:
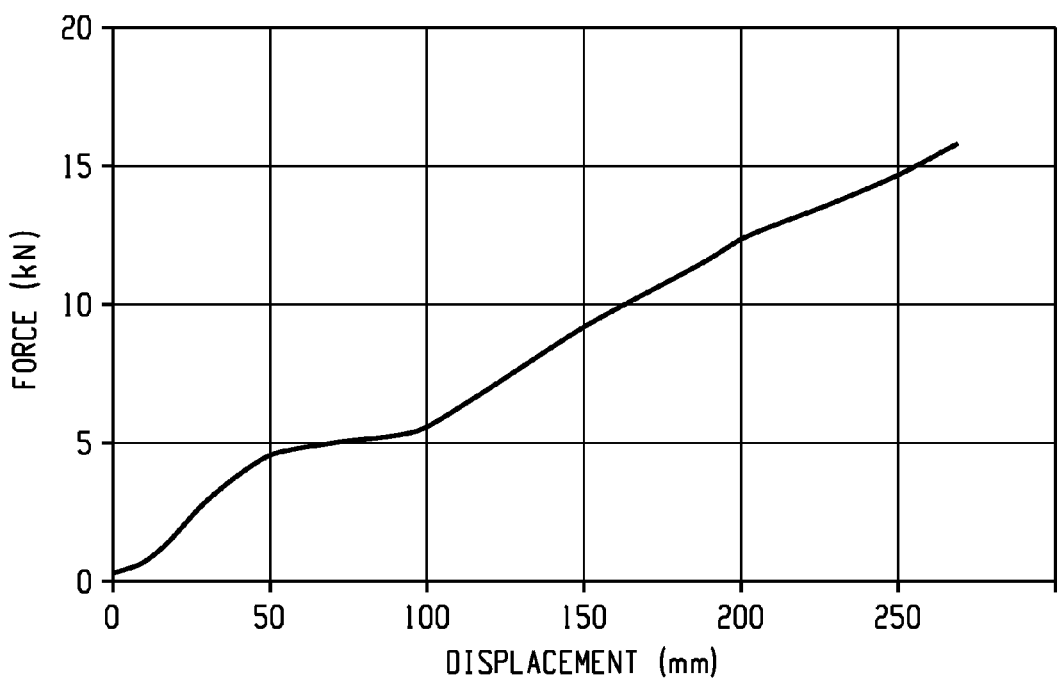
FIG. 8 illustrates a force versus deflection curve of an electric vehicle charging station having the design illustrated in FIG. 1.
Figure 9:
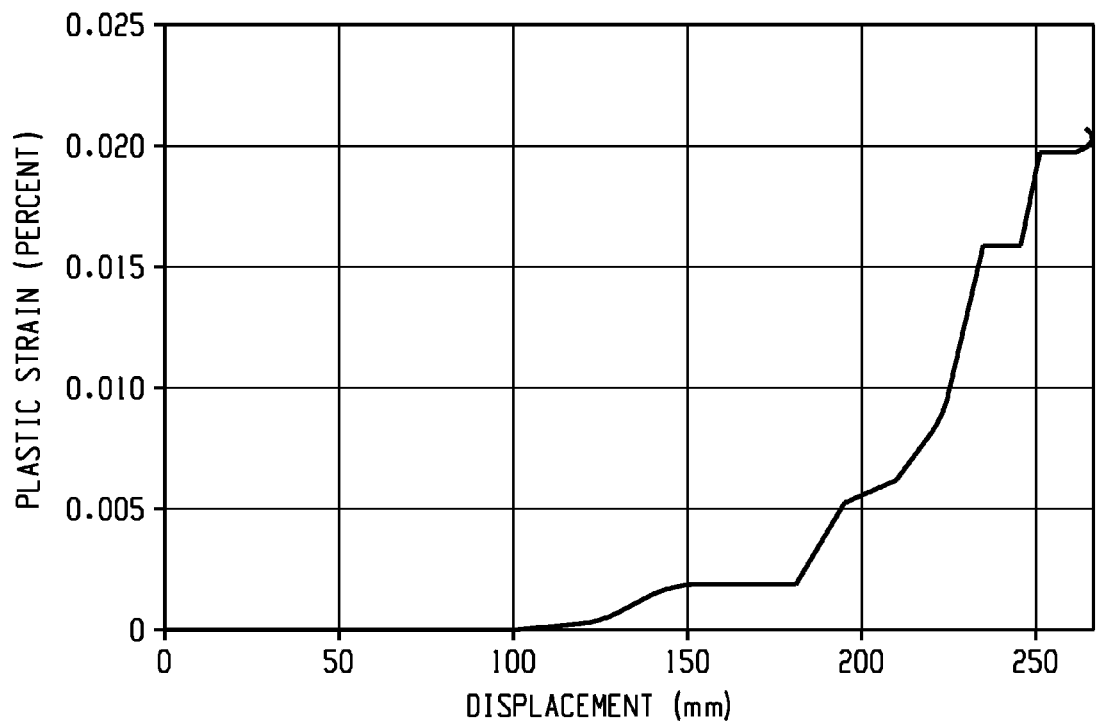
FIG. 9 illustrates a plastic strain versus displacement curve of an electric vehicle charging station having the design illustrated in FIG. 1.

FIG. 7 illustrates an experimental test arrangement for a numerical simulation of an impact of an electric vehicle charging station having the design illustrated in FIG. 1 with a vehicle (70) at a speed of 8 kilometers per hour (kph) (5 miles per hour (mph)). The direction of the impacting force (80) is perpendicular to the major axis, y, of the body (100). The body comprises polycarbonate (e.g., LEXAN*, commercially available from SABIC Innovative Plastics), while the deflector mechanism comprises metal. FIG. 8 illustrates the force versus displacement curve resulting from the impact. As illustrated in FIG. 8, a uniform force is build up during smooth tilting of the electric vehicle charging station. FIG. 9 shows the maximum plastic strain in the body (100) versus deflection. The maximum plastic strain in the body (100) is observed as 2.0%, which is lower than the failure strain of the polymeric material (30%) used in this example. So no damage to the body is observed after impact.

In one embodiment, an electric vehicle charging station comprises: a body attached to a base, wherein the base is operably connected to a deflector mechanism, wherein the body moves from a rest position disposed along a major axis of the electric vehicle charging station to an impact position, with an articulation angle disposed therebetween, upon an impact having a force greater than or equal to 2 kiloNewtons.

In one embodiment, a deflector mechanism comprises: a base and a mounting bracket, wherein sidewalls extend from the base to an opening in the mounting bracket; and a thrust plate disposed between a biasing portion and a tilting mechanism, wherein a neck of the tilting mechanism extends through the opening, wherein the neck of the tilting mechanism extends to form a vessel configured to attach to a body of an electric vehicle charging station.

In one embodiment, a method of making an electric vehicle charging station comprises: attaching a body to a base, wherein the base is operably connected to a deflector mechanism that is configured to allow the body to move from a rest position to an impact position upon an impact with a force greater than or equal to 100 kN.

In the various embodiments, (i) the articulation angle is greater than or equal to 5 degrees; and/or (ii) the electric vehicle charging station remains in the impact position until an opposite force is applied; and/or (iii) the deflector mechanism further comprises a mounting bracket extending from the base toward the body, wherein the mounting bracket comprises a tilting mechanism comprising a ball and a neck, wherein the neck extends through an opening in the mounting bracket; and/or (iv) wherein the tilting mechanism comprises a bore configured to receive electrical wiring; and/or (v) the deflector mechanism further comprises a biasing portion and a thrust plate, wherein a first surface of the tilting mechanism is disposed on the thrust plate and wherein the thrust plate urges the tilting mechanism to the rest position; and/or (vi) the opening has a diameter, $d_1$, that is less than the diameter, $d_2$, of the ball of the tilting mechanism; and/or (vii) the force is greater than or equal to 5 kiloNewtons; and/or (viii) the angle, $\theta$ is 0 to 90 degrees off the major axis of the electric vehicle charging station; and/or (ix) the biasing portion comprises a member selected from the group consisting of a spring, magnet, resilient material, and combinations comprising at least one of the foregoing; and/or (x) the body comprises a material selected from the group consisting of polycarbonate/poly(butyleneterephthalate), polypropylene, high-density polyethylene, polycarbonate-siloxane copolymer, polycarbonate, polycarbonate/acrylonitrile-styrene-acrylate, and combination comprising at least one of the foregoing; and/or (xi) the opening comprises an oval shape with having an aspect ratio that is less than the diameter, $d_2$, of a ball of the tilting mechanism; and/or (xii) the vessel can be tilted at an angle $\theta$ of 0 to 90 degrees off a major axis of the electric vehicle charging station, when subject to an impact having a force greater than or equal to 2 kiloNewtons.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to differentiate one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. "Optional" or "optionally" means that the subsequently described event or circumstance can or cannot occur, and that the description includes instances where the event occurs and instances where it does not.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value. Likewise, the term "operably connected" can refer to circumstances where two members are directly or indirectly joined such that motion can be transmitted from one member to the other member directly or via intermediate members. In another embodiment, the term refers to circumstances where two objects are joined in any desired form for example, mechanically, electronically, directly, magnetically, and the like.

What is claimed is:

1. A tiltable electric vehicle charging station, comprising:
    a body attached to a base;
    a mounting bracket extending from the base toward the body, wherein the mounting bracket comprises an opening;
    a deflector mechanism comprising a biasing portion and a tilting mechanism;
    wherein the tilting mechanism is disposed in the mounting bracket and wherein the tilting mechanism comprises a neck that extends through the opening in the mounting bracket;
    wherein the biasing portion is disposed in the mounting bracket between the tilting mechanism and the base and in operable communication with the tilting mechanism;
    wherein the body is configured to move from a rest position disposed along a major axis of the electric vehicle charging station to an impact position, with an articulation angle disposed therebetween, upon an impact having a force greater than or equal to 5 kiloNewtons, which causes the tilting mechanism to pivot.

2. The tiltable electric vehicle charging station of claim 1, wherein the articulation angle is greater than or equal to 5 degrees.

3. The tiltable electric vehicle charging station of claim 1, wherein the electric vehicle charging station remains in the impact position until an opposite force is applied.

4. The tiltable electric vehicle charging station of claim 1, wherein the tilting mechanism comprises a ball extending from the neck.

5. The tiltable electric vehicle charging station of claim 4, wherein the tilting mechanism comprises a bore configured to receive electrical wiring.

6. The tiltable electric vehicle charging station of claim 4, wherein the deflector mechanism further comprises a biasing portion and a thrust plate, wherein a first surface of the tilting mechanism is disposed on the thrust plate and wherein the thrust plate urges the tilting mechanism to the rest position.

7. The tiltable electric vehicle charging station of claim 4, wherein the opening has a diameter, $d_1$, that is less than the diameter, $d_2$, of the ball of the tilting mechanism.

8. The electric vehicle charging station of claim 1, wherein the force is greater than or equal to 2 kiloNewtons.

9. The tiltable electric vehicle charging station of claim 1, wherein the impact position is at an angle, $\theta$, 0 to 90 degrees off the major axis of the electric vehicle charging station.

10. The tiltable electric vehicle charging station of claim 6, wherein the biasing portion comprises a member selected from the group consisting of a spring, magnet, resilient material, and combinations comprising at least one of the foregoing.

11. The tiltable electric vehicle charging station of claim 1, wherein the body comprises a material selected from the group consisting of acrylonitrile-styrene-acrylate, polycarbonate/poly(butyleneterephthalate), polypropylene, high-density polyethylene, low-density polyethylene, polycarbonate-siloxane copolymer, polycarbonate, polycarbonate/acrylonitrile-styrene-acrylate, and combinations comprising at least one of the foregoing.

12. The tiltable electric vehicle charging station of claim 1, wherein the material further comprises a reinforcing filler selected from the group consisting of glass fibers, carbon fibers, mineral fillers, natural fibers, polymeric fibers, and combinations comprising at least one of the foregoing.

13. A deflector mechanism, comprising:
    a base and a mounting bracket, wherein sidewalls extend from the base to an opening in the mounting bracket; and
    a thrust plate disposed between a biasing portion and a tilting mechanism, wherein a neck of the tilting mechanism extends through the opening, wherein the neck of the tilting mechanism extends to form a vessel configured to attach to a body of an electric vehicle charging station;
    wherein the biasing portion is disposed in the mounting bracket between the tilting mechanism and the base and in operable communication with the tilting mechanism;
    wherein the body is configured to move from a rest position disposed along a major axis of the electric vehicle charging station to an impact position, with an articulation angle disposed there between, upon an impact having a force greater than or equal to 5 kiloNewtons, which causes the tilting mechanism to pivot.

14. The deflector mechanism of claim 13, wherein the opening comprises an oval shape with having an aspect ratio that is less than the diameter, $d_2$, of a ball of the tilting mechanism.

15. The deflector mechanism of claim 13, wherein the vessel is tilted at an angle $\theta$ of 0 to 90 degrees off a major axis of the electric vehicle charging station, when subject to an impact having a force greater than or equal to 2 kiloNewtons.

16. The deflector mechanism of claim 13, wherein the biasing portion comprises a member selected from the group consisting of a spring, magnet, resilient material, and combinations comprising at least one of the foregoing.

17. The deflector mechanism of claim 13, wherein the body comprises a material selected from the group consisting of acrylonitrile-styrene-acrylate, polycarbonate/poly(butyleneterephthalate), polypropylene, high-density polyethylene, low-density polyethylene, polycarbonate-siloxane copolymer, polycarbonate, polycarbonate/acrylonitrile-styrene-acrylate, and combinations comprising at least one of the foregoing.

18. The deflector mechanism of claim 17, wherein the material further comprises a reinforcing filler selected from the group consisting of glass fibers, carbon fibers, mineral fillers, natural fibers, polymeric fibers, and combinations comprising at least one of the foregoing.

19. A method of making an electric vehicle charging station, comprising:
- attaching a body to a base, wherein the base is operably connected to a deflector mechanism that is configured to allow the body to move from a rest position to an impact position upon an impact with a force greater than or equal to 5 kiloNewtons;
- wherein the deflector mechanism further comprises a mounting bracket extending from the base toward the body,
- wherein the mounting bracket comprises a tilting mechanism comprising a ball and a neck, wherein the neck extends through an opening in the mounting bracket;
- wherein the mounting bracket further comprises a biasing portion;
- wherein the biasing portion is disposed between the tilting mechanism and the base and in operable communication with the tilting mechanism.

20. The tiltable electric vehicle charging station of claim 1, wherein the tilting mechanism further comprises a bore with wiring extending therethrough, wherein the articulation angle can be preserved without causing damage to the wiring.

* * * * *